US011916918B2

(12) United States Patent
Wang et al.

(10) Patent No.: US 11,916,918 B2
(45) Date of Patent: Feb. 27, 2024

(54) SYSTEM MODE OVERRIDE DURING FLOW EXECUTION

(71) Applicant: salesforce.com, inc., San Francisco, CA (US)

(72) Inventors: Yucheng Wang, San Carlos, CA (US); Saravanan Adaikkalavan, Fremont, CA (US); Hao Wu, Hayward, CA (US); Hugh Cockburn, Irvine, CA (US); Colin Frank, Orinda, CA (US); Kaysha Chandran, Orinda, CA (US); William Charles Eidson, Palo Alto, CA (US); Timothy Peng, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 316 days.

(21) Appl. No.: 16/848,644

(22) Filed: Apr. 14, 2020

(65) Prior Publication Data

US 2021/0320927 A1    Oct. 14, 2021

(51) Int. Cl.
  *G06F 3/0482*    (2013.01)
  *H04L 9/40*    (2022.01)
  (Continued)

(52) U.S. Cl.
  CPC .......... *H04L 63/105* (2013.01); *G06F 3/0482* (2013.01); *G06F 16/2379* (2019.01);
  (Continued)

(58) Field of Classification Search
  CPC ... H04L 63/105; H04L 63/102; H04L 67/306; H04L 63/083; H04L 67/10; G06F 3/0482; G06F 16/2379; G06F 16/252
  See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

FOREIGN PATENT DOCUMENTS

| JP | 2005503596 A | * | 1/2002 |
| JP | 2002517853 A | * | 6/2002 |

OTHER PUBLICATIONS

Field Level Security by profile vs field permissions in Permission Sets, retrieved from—https://developer.salesforce.com/forums/?id=906F0000000BXThIAO, Sep. 21, 2015, 2 pages (Year: 2015).*

(Continued)

*Primary Examiner* — Yongjia Pan
(74) *Attorney, Agent, or Firm* — Weaver Austin Villeneuve & Sampson LLP

(57) ABSTRACT

Disclosed are some implementations of systems, apparatus, methods and computer program products for executing process flows. A request to initiate execution of a flow is processed, where the request is received from a first user. The flow includes a plurality of flow elements, where each of the flow elements represents a corresponding set of computer-readable instructions. Execution of the flow is initiated and an operation mode assigned to one of the flow elements is determined. A set of computer-readable instructions corresponding to the flow element is executed according to the operation mode such that an identity of the first user is recorded in association with an operation on a database record, wherein permissions allocated in a user profile to the first user do not provide the first user permission to cause the operation on the database record. Output indicating a result of executing the set of computer-readable instructions according to the operation mode is provided for presentation via a graphical user interface (GUI).

20 Claims, 10 Drawing Sheets

(51) Int. Cl.
*G06F 16/23* (2019.01)
*H04L 67/306* (2022.01)
*G06F 16/25* (2019.01)

(52) U.S. Cl.
CPC .......... *G06F 16/252* (2019.01); *H04L 63/102* (2013.01); *H04L 67/306* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,823,513 B1 * | 11/2004 | McNally ............ G06F 21/629 718/104 |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,127,461 B1 * | 10/2006 | Zhu .................... G06F 21/6218 707/999.009 |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,529,931 B2 * | 5/2009 | Vasishth ............... H04L 63/102 726/28 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,805,324 B2 * | 9/2010 | Green ............... G06Q 10/0633 717/106 |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,185,550 B1 * | 5/2012 | Eichler ................ G06F 21/604 709/224 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,296,727 B2 * | 10/2012 | Degenhardt ........... G06Q 10/06 717/109 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,627,323 B2 * | 1/2014 | Irani .................. G06Q 10/0631 705/7.26 |
| 8,646,103 B2 | 2/2014 | Jakobson et al. |
| 8,874,621 B1 * | 10/2014 | Goodwin ............ G06F 16/289 707/756 |
| 9,300,671 B1 * | 3/2016 | Barak .................... H04L 63/10 |
| 9,460,303 B2 * | 10/2016 | MacLeod ............ G06Q 10/06 |
| 9,891,810 B2 * | 2/2018 | Caporal .............. H04L 65/403 |
| 10,108,613 B2 * | 10/2018 | Spataro ............... G06F 16/93 |
| 10,230,731 B2 * | 3/2019 | Weaver ............... G06F 40/166 |
| 10,346,625 B2 * | 7/2019 | Anderson .......... G06F 21/6209 |
| 2001/0044791 A1 | 11/2001 | Richter et al. |
| 2002/0072951 A1 | 6/2002 | Lee et al. |
| 2002/0082892 A1 | 6/2002 | Raffel et al. |

(56) References Cited

U.S. PATENT DOCUMENTS

| | | |
|---|---|---|
| 2002/0129352 A1 | 9/2002 | Brodersen et al. |
| 2002/0138543 A1* | 9/2002 | Teng ................. G06F 21/41 |
| | | 707/E17.005 |
| 2002/0140731 A1 | 10/2002 | Subramaniam et al. |
| 2002/0143997 A1 | 10/2002 | Huang et al. |
| 2002/0152254 A1* | 10/2002 | Teng ................. H04L 63/0823 |
| | | 718/100 |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0249885 A1* | 12/2004 | Petropoulakis ........... G06F 9/54 |
| | | 709/204 |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0138566 A1* | 6/2005 | Muller ................. G06Q 10/00 |
| | | 715/752 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0223557 A1* | 9/2010 | Kenney ................. G06Q 10/10 |
| | | 707/E17.014 |
| 2011/0218958 A1 | 9/2011 | Warshaysky et al. |
| 2011/0246527 A1* | 10/2011 | Bitting ................. G06F 21/604 |
| | | 707/E17.001 |
| 2011/0247051 A1 | 10/2011 | Bulumulla et al. |
| 2012/0042218 A1 | 2/2012 | Cinarkaya et al. |
| 2012/0222132 A1* | 8/2012 | Burger ................. G06F 21/604 |
| | | 726/28 |
| 2012/0233137 A1 | 9/2012 | Jakobson et al. |
| 2012/0290407 A1 | 11/2012 | Hubbard et al. |
| 2012/0331568 A1* | 12/2012 | Weinstein ............. H04L 12/185 |
| | | 726/29 |
| 2013/0054648 A1* | 2/2013 | Mehta ..................... G06F 16/21 |
| | | 707/E17.005 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0298128 A1* | 11/2013 | Russinovich ....... G06F 12/1491 |
| | | 718/100 |
| 2014/0059651 A1* | 2/2014 | Luster ................. G06F 21/604 |
| | | 726/4 |
| 2014/0359537 A1 | 12/2014 | Jakobson et al. |
| 2014/0359695 A1* | 12/2014 | Chari ................. G06F 21/604 |
| | | 726/1 |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0304388 A1* | 10/2015 | Procopio ............... H04L 67/561 |
| | | 709/204 |
| 2018/0121665 A1* | 5/2018 | Anderson ........... G06F 21/6209 |
| 2018/0164979 A1* | 6/2018 | Caporal ................. G06F 3/0482 |
| 2019/0243984 A1* | 8/2019 | Duminy ................. H04L 63/102 |
| 2019/0253431 A1* | 8/2019 | Atanda ..................... G06F 21/62 |
| 2019/0377805 A1* | 12/2019 | Chilakamarri ........ G06F 16/338 |
| 2020/0092337 A1* | 3/2020 | Ojha ........................ H04L 63/20 |
| 2020/0151630 A1* | 5/2020 | Shakhnovich ..... G06Q 10/0633 |
| 2020/0234244 A1* | 7/2020 | Zhou ................. G06Q 10/1053 |
| 2020/0342123 A1* | 10/2020 | Nadler ................. H04L 63/0407 |
| 2021/0064769 A1* | 3/2021 | Yu ........................... G06F 21/31 |
| 2021/0303714 A1* | 9/2021 | Yaghoobi ............... G06N 7/005 |

OTHER PUBLICATIONS

"Google Plus Users", Google+Ripples, October 31, 2011 [retrieved on Feb. 21, 2012 from Internet at http://www.googleplusers.com/google-rippleshtml], 3 pages.

* cited by examiner

SYSTEM MODE OVERRIDE DURING FLOW EXECUTION

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with generation, configuration, and execution of process flows. More specifically, this patent document discloses techniques for escalating user permissions during execution of process flows.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, and instant messaging systems, by way of example, in a cloud computing environment.

An organization may provide a variety of services to users via an organization's website. To ensure that data remains secure, users are often assigned individual permissions that govern the data that they can access. Automated processes typically apply the individual permissions of users to prevent organizational data from being compromised.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

DETAILED DESCRIPTION

Figure 1:
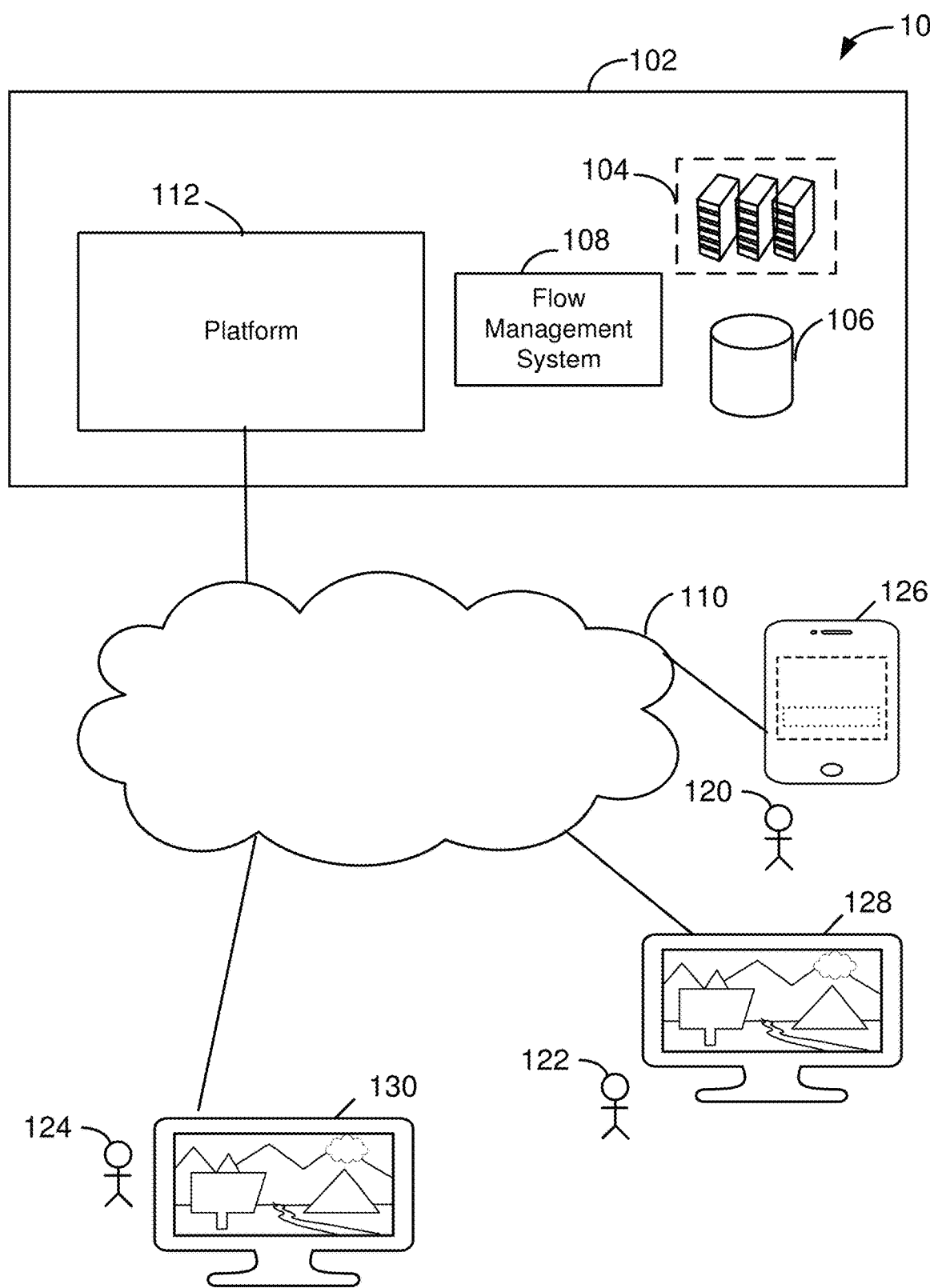
FIG. 1 shows a system diagram of an example of a system 100 in which a flow management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for managing process flows. Process flow management can include generation, configuration, and/or execution of process flows according to the corresponding configurations. A process flow may also be referred to as a flow. A flow can include one or more flows, which may be referred to as sub-flows.

In some implementations, individual flows may be generated using a flow builder. A flow may be stored in a data structure such as a linked list, tree, or other suitable data structure. Each flow may be represented by a visual representation that can be rendered via a display of a client device. A flow may include one or more elements that each corresponds to a set of computer-readable instructions.

In many systems, individual permissions of users control access to organizational data, and may vary according to the type, source, or category of data to which access is being limited. These permissions often include read, write, read/write, and/or delete access of organizational data. For example, a user may have read/write permission for Case database records but only have read permission for Account database records. Individual permissions are generally configured within a user profile.

Permissions of a user can indicate sharing rules that govern the ability to access the user's data. A sharing rule may indicate specific individuals or categories of individuals allowed to access the user's data. For example, a sharing rule may indicate a role hierarchy that governs the categories of users permitted to access the user's data.

A user within an organization or external to the organization may initiate execution of a flow. During execution of a given flow, that flow will often access various categories of data. For example, the data accessed by a flow may include, but is not limited to, user data, sales data, marketing data, or account data. Often, data accessed by a flow will be processed without displaying or otherwise providing the user access to the data.

Unfortunately, automated process flows initiated by users may be unable to successfully execute if individual permissions do not grant those users access to the data that would be accessed by those processes. Therefore, in some instances, individual permissions may prevent a process from executing successfully.

The disclosed implementations solve these problems by overriding or ignoring individual permissions during flow execution. This may be accomplished based upon flow configurations, as will be described in further detail below.

In some implementations, operation modes associated with flows may be configured to enable successful execution independent from individual permissions. More particularly, an operation mode may be configured on a per-flow basis. For example, an administrator or software developer may configure a flow based upon various criteria such as functionality of the flow, department in which the flow will be implemented, or the tenant of a multi-tenant database system for which the flow will be implemented. Example operation modes include "run as user" mode and "run as system" mode. In some implementations, multiple system modes are supported, as will be described in further detail below.

A "run as user" operation mode may apply permissions that have been assigned to a user independent of process flow management. Specifically, the permissions of the user initiating a flow or for which the flow is initiated may be applied during execution of the flow. The permissions may be maintained in a user profile and accessed during execution of flows that have been configured with a "run as user" operation mode. Permissions can limit a user's ability to access or modify database records, specific fields of database records, and/or metadata associated with database records. For example, permissions can include read, write, update, and/or delete privileges A "run as system" operation mode may apply system permissions that provide a user greater access to database records than the user's permissions would otherwise provide. For example, an administrator may have assigned a user only read privileges. During "run as system" operation mode, a database record may be created or updated notwithstanding the fact that the user's permissions do not provide the user the ability to create or update the database record.

In some implementations, an element of a flow may be a user interface element including a graphical user interface (GUI) that may be rendered via a display. A user interface element may enable user input to be received and/or provided for display via a client device. Where a sub-flow corresponding to a user interface element is executed in "run as system" operation mode, output of the sub-flow may be displayed, resulting in the user being able to access data that they would not otherwise be able to access.

In some implementations, a request to initiate execution of a flow is received from a user and processed. For example, the user may select a tab, menu option, or other user interface object. Execution of the flow is initiated. During flow execution, an operation mode assigned to a set of computer-readable instructions corresponding to one of the flow elements is determined, where the operation mode indicates a level of permissions that is applicable to the set of computer-readable instructions. For example, the flow element may correspond to a sub-flow. The set of computer-readable instructions is executed according to the operation mode such that an identity of the user is recorded in association with an operation on a database record. The operation may be performed on the database record even if permissions allocated in a user profile to the user do not provide the user permission to cause the operation on the database record. Output indicating a result of executing the set of computer-readable instructions according to the operation mode may be provided for presentation via a GUI.

In some implementations, the level of permissions that is applicable to a set of computer-readable instructions indicates escalated permissions for the user. In other words, the permissions of the user may be ignored by the process in favor of escalated system permissions. In other implementations, the level of permissions may correspond to another individual's permissions By way of illustration, Zachary is an employee at an organization, Acme Construction, Inc. Zachary is manager of the Sales Department and has a new sales employee, Emily, complete an "onboarding" process that guides new employees through a series of steps that enables employee records to be generated and appropriate resources to be allocated. Since Emily is in the sales department, her user profile permissions do not provide Emily the authority to create employee records. However, through the onboarding process, an employee record may be created for Emily since the record creation sub-flow has been configured with a "run as system" mode. Therefore, permissions allocated to Emily in her user profile are ignored by the record creation sub-flow.

While Emily is completing the onboarding process, she indicates that she prefers a laptop over a desktop. The system assigns her a laptop and maintains a record of Emily's identity in association with the laptop. Thus, Emily's assigned profile permissions, which do not provide Emily authority to generate employee or resource allocation records, are ignored in favor of "escalated" permissions offered during system mode. These escalated privileges enable records to be created during a process initiated by Emily despite the fact that Emily's user profile does not give Emily these privileges. While a sub-flow may be executed in system mode, Emily's user identity is recorded in association with various steps of the flow. Later, when a computer is allocated to Emily, the Information Technology (IT) department ascertains from a resource request record that the laptop request has been submitted by Emily rather than her supervisor. The IT department contacts Emily to discuss available options.

FIG. 1 shows a system diagram of an example of a system 100 in which a flow management system is implemented, in accordance with some implementations.

Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. In some implementations, storage mediums 106 can store a flow library, computer-readable instructions corresponding to flows in the flow library, and flow configurations indicating the configured operation modes for various flows. System 102 also includes a flow management system 108 that enables flows to be generated, configured, and executed. Storage mediums 106 can also store user profiles and database records such as customer relationship management (CRM) records, as described in further detail below.

In some implementations, system 102 is configured to store user profiles/user accounts associated with users of system 102. Information maintained in a user account of a user can include or indicate a user email address and credentials of the user. For example, credentials of the user can include a username and password. The information can also include the name of the user. In addition, the information can indicate a role of the user and associated permissions. For example, user profile permissions of a sales employee may enable the sales employee to access sales support services without having access to employee records. As another example, user profile permissions of an administrator may enable the administrator to update user profile permissions for new employees and configure flow operation modes.

Client devices 126, 128, 130 may be in communication with system 102 via network 110. More particularly, client devices 126, 128, 130 may communicate with servers 104 via network 110 through platform 112. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, customer user 120 of client computing device 126 may have an account at Salesforce.com®. By logging into this account, the user can access services offered to customers. In other instances, customer user 120 does not have an account at Salesforce.com®. Employee user 122 may log into their account via client computing device 128 and access the various services provided by servers 104 to employees. For example, employee 122 may be a sales employee that accesses customer account records throughout their day as they interact with customers. Administrator user 124 may similarly log into their account via client computing device 130 to generate flows or configure operation modes for flows. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services via platform 112 or an application installed on client devices 126, 128, 130. More particularly, client devices 126, 128 can log into system 102 via an application programming interface (API) or via a graphical user interface (GUI) using credentials of corresponding users 120, 122, 124 respectively.

In some implementations, flow management system 108 enables a flow comprised of a plurality of elements to be executed according to element-specific operation modes. Specifically, an element may represent a sub-flow that has been configured with a specific operation mode. Therefore, a single flow may execute according to two or more operation modes as the various sub-flows are executed. An example flow management system will be described in further detail below with reference to FIG. 2.

Figure 2:
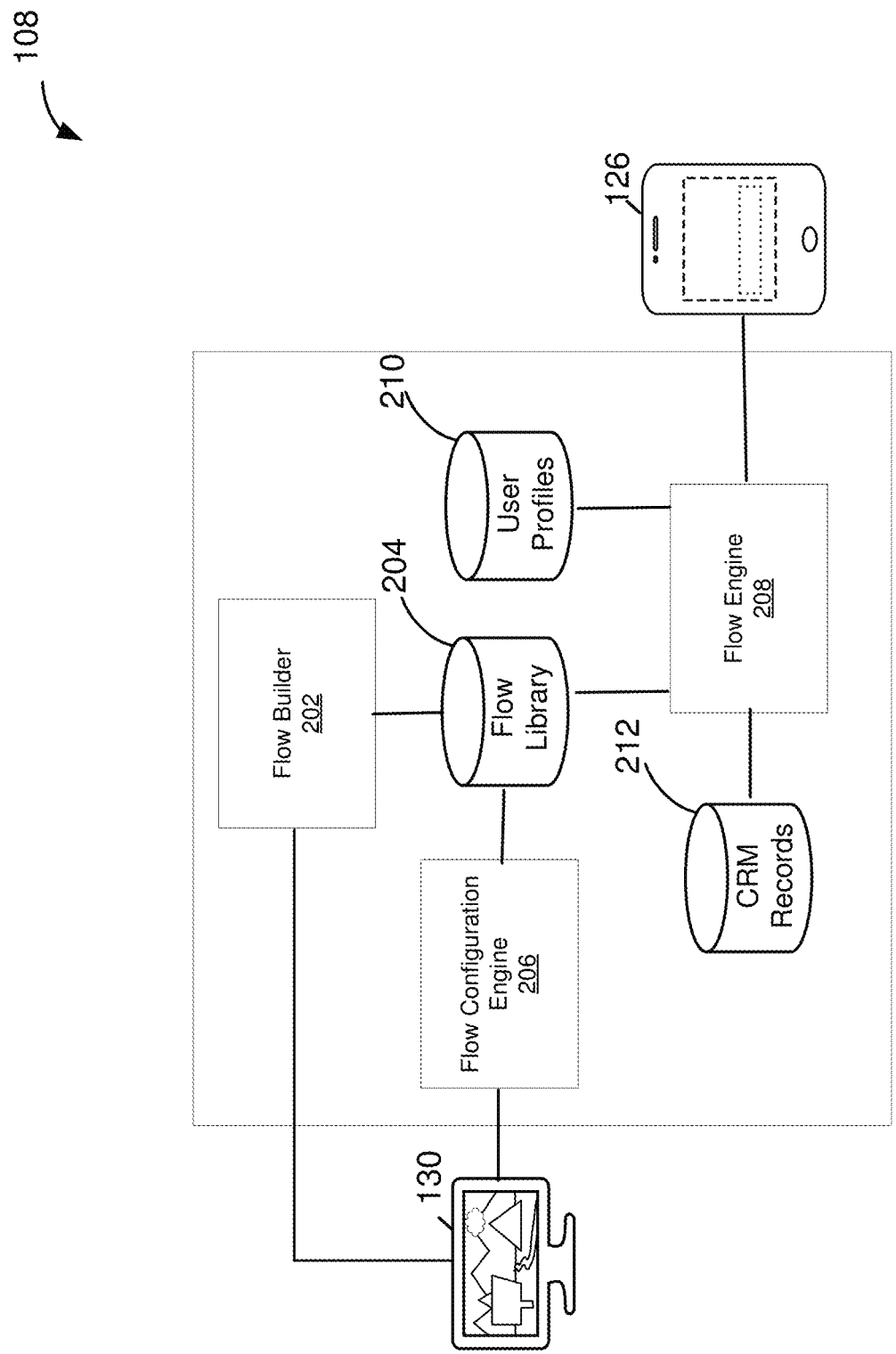
FIG. 2 shows a system diagram of an example of a flow management system 108, in accordance with some implementations.

FIG. 2 shows a system diagram of an example of a flow management system 108, in accordance with some implementations. Flow management system 108 can include a flow builder 202 that enables a flow to be generated using existing flows and other components. For example, an administrator or software developer may access flow builder 202 via computing device 130 to generate a flow including a plurality of elements. Flow builder 202 may represent the flow in the form of a plurality of interconnected elements. A flow may be provided for display via computing device 130, enabling the flow to be easily modified using drag-and-drop operations. An example flow will be described in further detail below with reference to FIG. 5.

Once generated, a flow may be stored in flow library 204. Each flow may be identified by a corresponding flow identifier. A flow may be stored in the form of a file that includes a set of computer-readable instructions. Flow library 204 may be accessed by specific departments or individuals having specific roles. A subset of the flows in flow library 204 may be configured for use with a specific department.

Flow configuration engine 206 enables an individual such as an administrator or software developer to configure operation modes of flows in flow library 204 via computing device 130. Operation mode configurations may be stored in association with the respective flows in flow library 204. Once configured, flow engine 208 may execute flows according to their configured operation modes. More particularly, a user may initiate execution of a flow via computing device 126. Flow engine 208 may access the flow from flow library 204. As flow engine 208 executes the flow, it may access sub-flows corresponding to elements of the flow from flow library 204 and execute the sub-flows in accordance with their respective operation modes. For sub-flows configured with a user mode, flow engine 208 may execute the sub-flows according to the user's permissions established via the user profile 210. For those sub-flows configured with a system mode, flow engine 208 may execute the sub-flows according to escalated permissions while ignoring the user's permissions. In system mode, database records such as CRM records 212 may be accessed independent of whether the user's permissions enable the CRM records 212 to be accessed. Access of a database record can include the performance of a create, update, read, or delete database operation on the database record. Access of a database record may result in the updating of the database record or an independent log file to record an identity of the user in association with the corresponding database operation. Therefore, operation in system mode results in the escalation of user privileges of a user initiating the flow while preserving the identity of the user.

Figure 3:
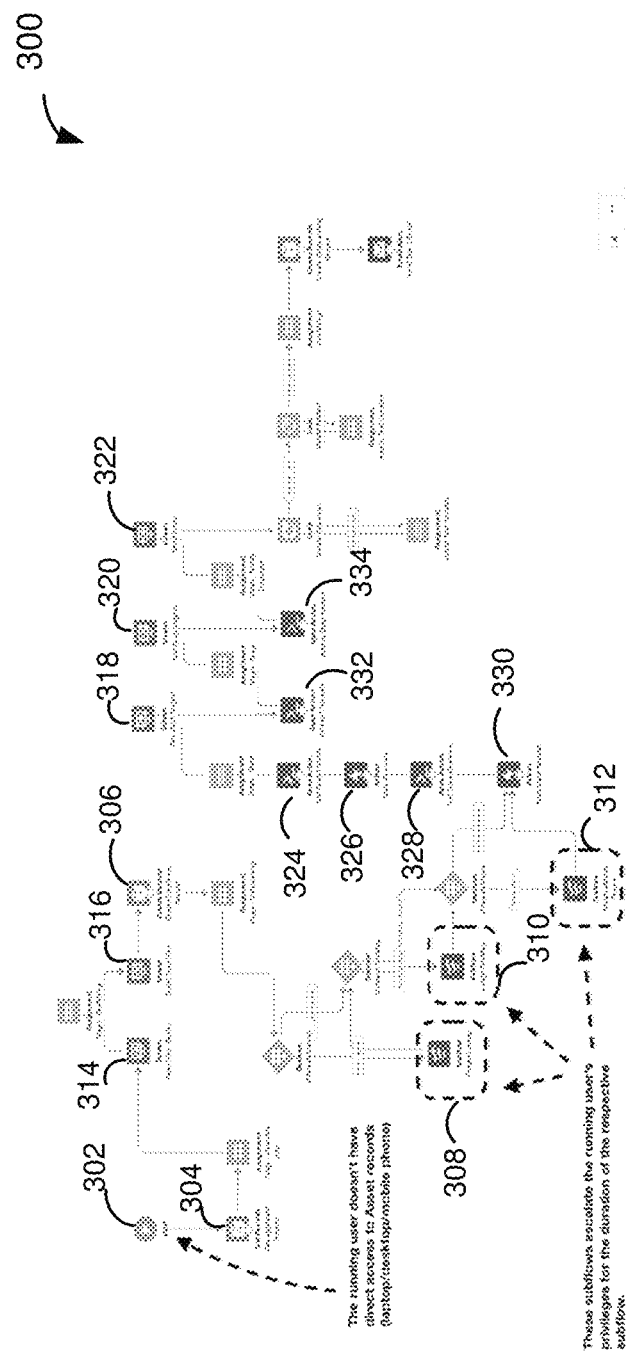
FIG. 3 shows a diagram of an example of a process flow 300 that may be executed, in accordance with some implementations.

FIG. 3 shows a diagram of an example of a process flow 300 that may be executed, in accordance with some implementations. Process flow 300 may be presented via a flow builder, enabling software designers and developers to easily build a flow using drag-and-drop operations. In this example, process flow represents an onboarding process during which resources are assigned to a new employee. Other examples of process flows include, but are not limited to, surveys, login flows, and provisioning flows that provision resources to users. A user may initiate the process (302) via their computing device. In this example, the user's permissions do not provide the user access to records such as resource records pertaining to assignment of physical resources or applicant/employee records. However, sub-flow "Get Records" 304 has been configured with a run as system mode, and therefore retrieves an applicant record for the user during execution of sub-flow 304. Similarly, sub-flow "Create Records" 306 has been configured with a run as system mode and creates an employee record for the user during execution of sub-flow 306. Similarly, sub-flows 308, 310, 312 have each been configured with a run as system mode, resulting in escalation of the user's privileges during the duration of the respective flow. Thus, resources including a laptop, desktop, and/or mobile phone may be assigned to the user by sub-flows 308, 310, 312, respectively. Therefore, database records may be accessed during a flow executed by a user even though the permissions of that user do not enable the user to access the records.

Screen elements 314-322 represent sets of computer-readable instructions that each presents a user interface element for display via a client device. Screen elements 314-322 may represent sub-flows, where one or more of the sub-flows has been configured with a run as system mode. A user interface element can include a GUI. The user interface element can obtain user input and/or present output for display via a GUI. In some instances, the output includes data obtained from database records. In other instances, the output may include data generated from database records. Therefore, screen elements 314-322 may enable users to access and view data from database records regardless of whether user permissions enable the user to access the database records.

One or more flow elements may correspond to actions that do not access database records. In this example, elements 324-334 represent actions for which a mode of operation is irrelevant. For example, the operation mode would be irrelevant to a flow that posts a message to a social network. Thus, sets of computer-readable instructions corresponding to elements 324-334 need not determine an operation mode.

Figure 4:
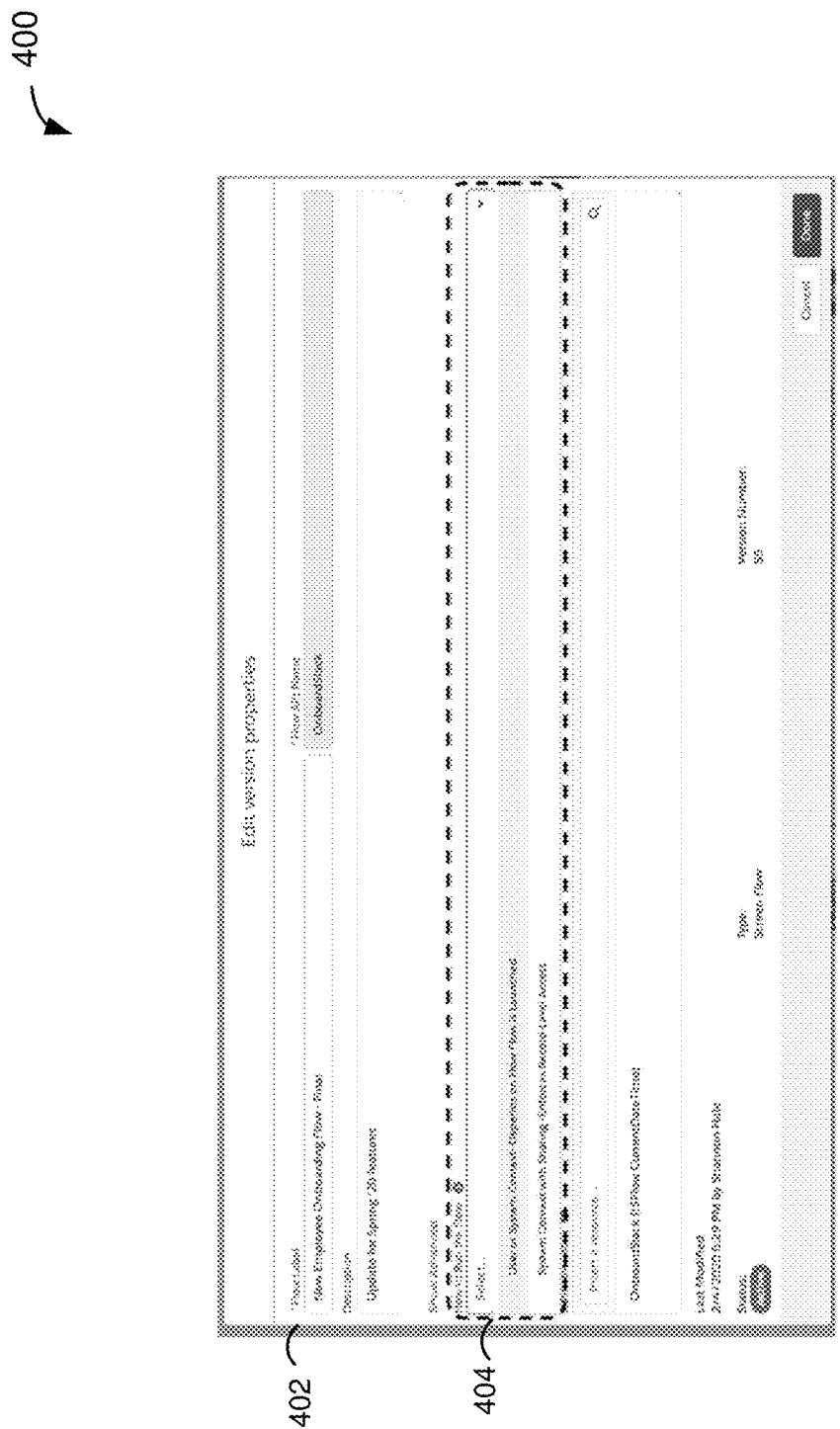
FIG. 4 shows an example of a graphical user interface (GUI) 400 via which a mode of operation may be configured for a process flow, in accordance with some implementations.

FIG. 4 shows an example of a graphical user interface (GUI) 400 via which a mode of operation may be configured for a process flow, in accordance with some implementations. GUI 400 enables an administrator or software developer to enter or select a flow label 402. As shown in this example, an administrator has selected the flow "New Employee Onboarding Flow." An operation mode may be selected for the flow at 404 from a set of two or more user-selectable configuration modes. In this example, the user selectable configuration modes include Run as System and Run as User.

In some implementations, user-selectable configuration modes include two or more system modes. For example, user-selectable system modes may include "system mode with sharing" and "system mode without sharing." A flow executed in "system mode with sharing" mode complies with sharing settings of users while a flow executed in "system mode without sharing" mode does not comply with sharing settings of users, as described in further detail below.

Sharing settings may be established by the user initiating execution of the flow (or parent flow) or an administrator. In some implementations, sharing settings associated with a user may indicate those individuals that may access (or may not access) database records of which the user is an owner or that otherwise contain user information for the user. These database records can include, for example, a user profile or other user information. In addition, sharing settings may indicate a permitted level of access allocated to various individuals. Thus, sharing settings may assign all individuals, specific individuals, or designated groups of individuals create, read, update, and/or delete permissions for database records of which the user is an owner or that contain user information associated with the user. In some implementations, sharing settings associated with a user may indicate other user records that the user may access and the permitted level of access (e.g., create, read, update, and/or delete).

A system mode with sharing configuration may result in a corresponding flow that complies with the sharing settings associated with the user and/or other users during run-time. In some implementations, sharing settings of a user may permit other individuals to view that user's name or other information in a list of users or search results. Similarly, sharing settings of a user may prevent other individuals from viewing that user's name or other information in a list of users or search results. Thus, in system mode with sharing, a user may be identified in a list or search if sharing settings of that user provide other user(s) read access.

In contrast, system mode without sharing results in a corresponding flow that ignores sharing settings associated with the user during run-time. As a result, the flow may have unrestricted access to database records "owned" by the user during execution of the flow. In other words, restrictions on database record access established by user sharing settings may be overridden. In some implementations, the flow may have unrestricted access to database records owned by all users during execution of the flow.

In some implementations, user-selectable operation modes include an operation mode having an associated condition. In other words, the operation mode that is applied is conditional. Stated another way, the operation mode that is applied during run-time may depend upon whether the condition is satisfied. The condition may be a default condition or may be user-defined.

In some implementations, a flow engine may select the operation mode dynamically during run-time from two or more options based, at least in part, on a condition established via the operation mode configuration. For example, the flow may be executed in "Run as User" mode if the condition is not satisfied and executed in "Run as System" mode if the condition is satisfied, or vice versa. In some instances, the operation mode may be determined based, at least in part, on the manner that the corresponding flow is launched.

During configuration of an operation mode for a flow (e.g., sub-flow), an indication of a user selection of one of a plurality of operation modes may be obtained. Metadata including an indication of the selected operation mode may then be stored in association with the flow. During execution of the flow, a flow handler may determine an operation mode assigned to the flow using the metadata. For example, the metadata may be obtained from a global variable or data structure or, alternatively, may be transmitted to the flow via a parameter of the flow.

Figure 5:
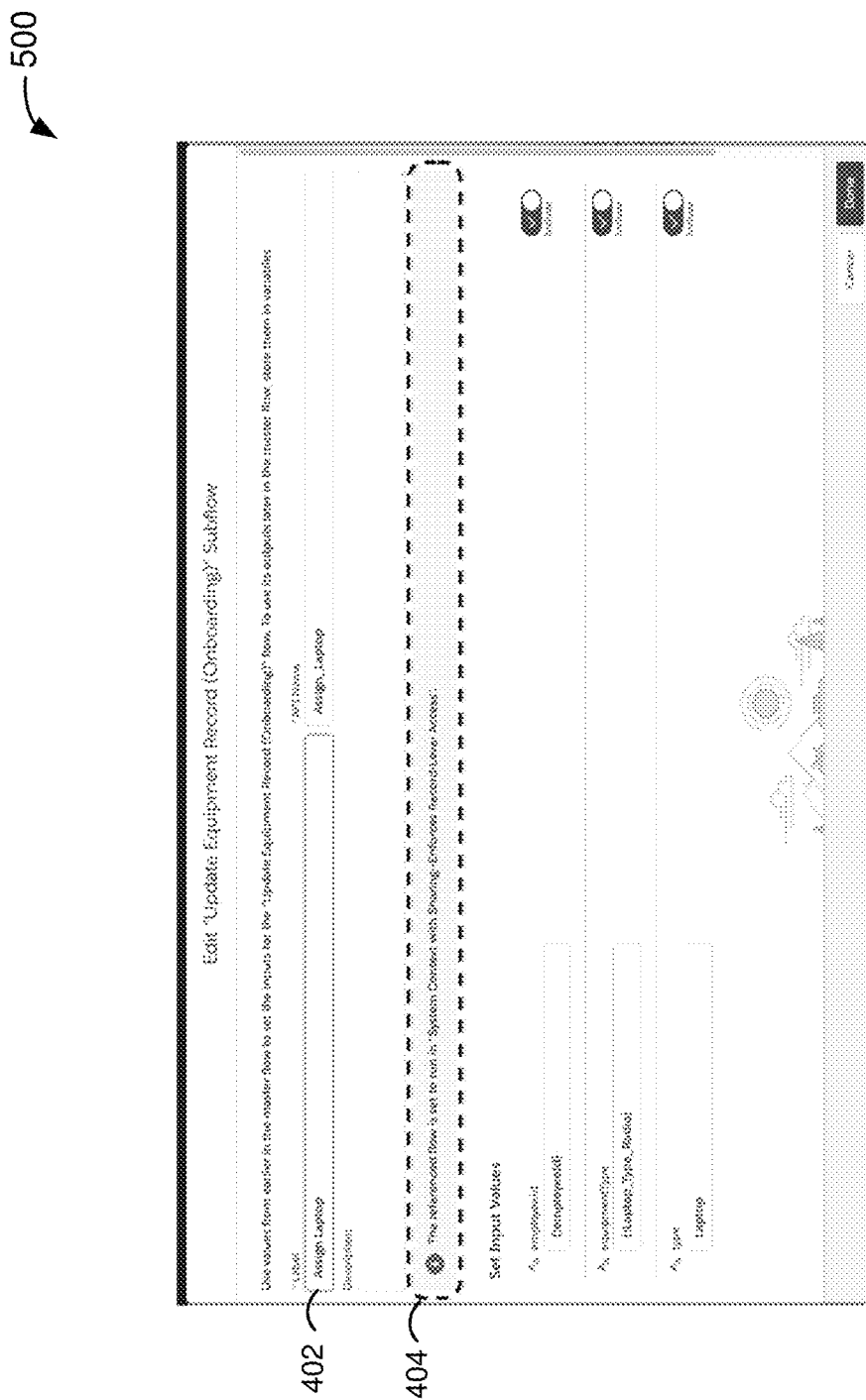
FIG. 5 shows an example of a GUI 500 via which a mode of operation is configured for a sub-flow, in accordance with some implementations.

FIG. 5 shows an example of a GUI 500 via which a mode of operation is configured for a sub-flow, in accordance with some implementations. In this example, the selected flow is "Assign Laptop," as shown at 402. In addition, the selected operation mode is "System Mode with Sharing."

Figure 6:
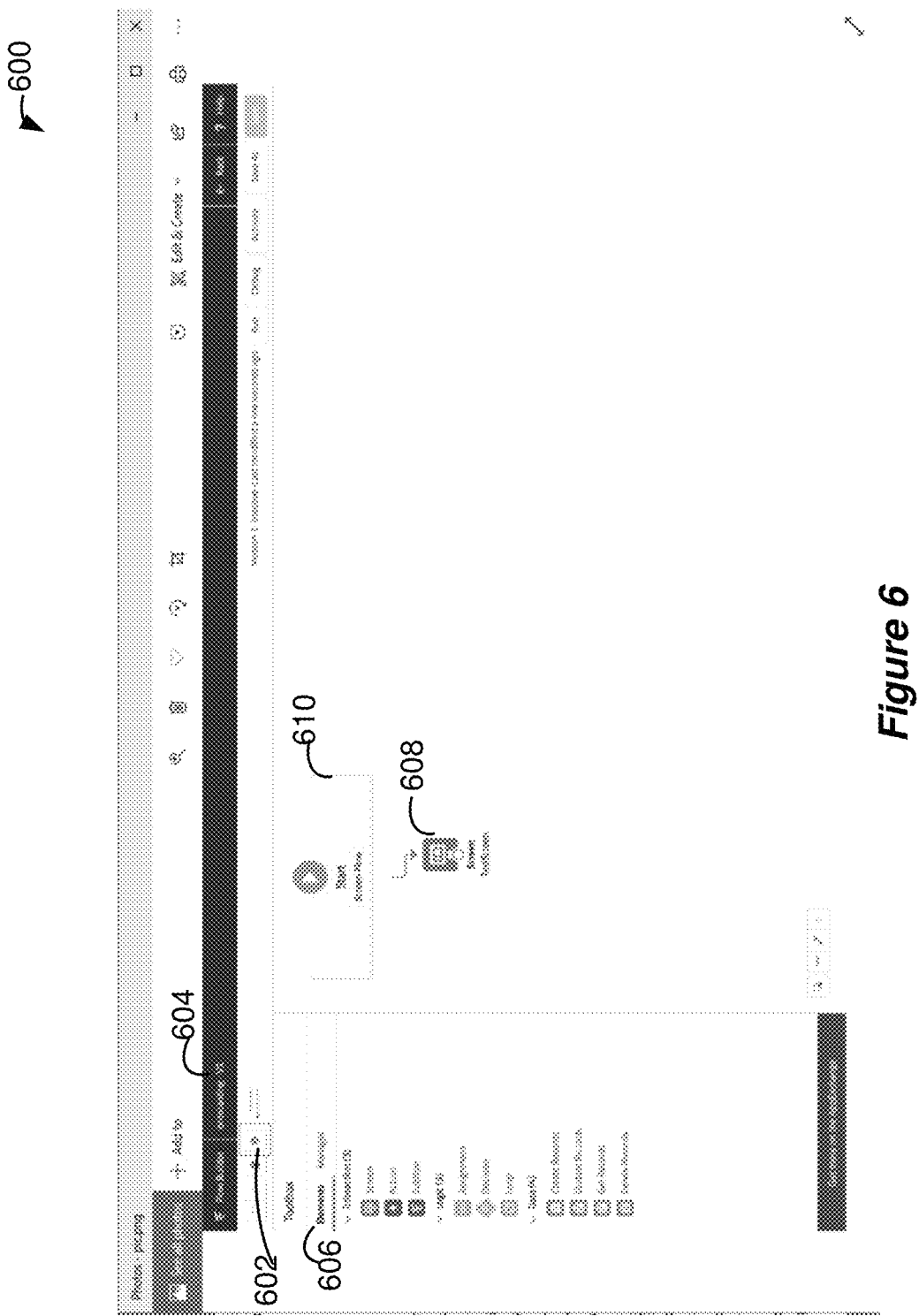
FIG. 6 shows an example of GUI 600 via which a process flow may be configured, in accordance with various implementations.

FIG. 6 shows an example of GUI 600 via which a process flow may be configured, in accordance with various implementations. In this example, a process flow may be configured via a Flow Builder that enables an administrator or software developer to configure a flow. Specifically, an administrator may select user interface object 602 to configure an operation mode for a designated flow 604. In response, a system mode configuration screen such as that shown in FIGS. 4 and 5 may be provided for display by a client device. To modify the flow, the administrator may add one or more elements 606 to the flow. This may be accomplished, for example, by dragging and dropping an element into the flow. For example, screen element 608 may be added to the flow by dragging and dropping a screen element from elements 606 into the flow. The flow may be executed within the context of the Flow Builder by clicking Start 610.

Figure 7:
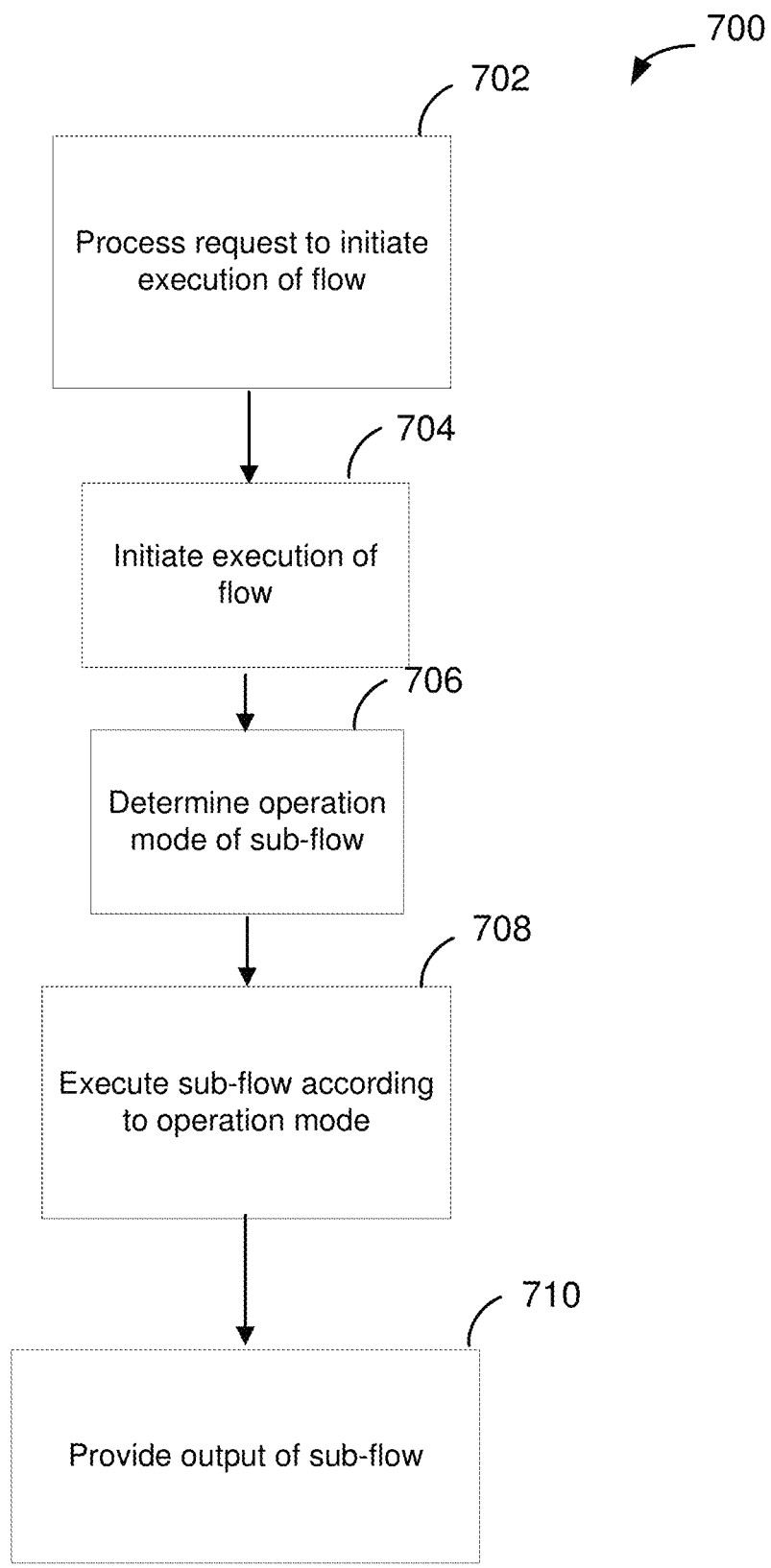
FIG. 7 shows an example of a method 700 for executing a process flow, in accordance with some implementations.

FIG. 7 shows an example of a method 700 for executing a process flow, in accordance with some implementations. A user may submit a request to initiate execution of a flow or another individual may submit the request on behalf of the user. For example, the user may click on or select "Start" for the flow. Alternatively, the flow may be initiated responsive to a specific trigger or event. A trigger may be generated according to a schedule, user action, or system event. The request to initiate execution of a flow is processed, where the request is received from a user (702). The flow includes a plurality of flow elements, where each of the flow elements represents a corresponding set of computer-readable instructions.

A flow engine may initiate execution of the flow responsive to the request (704). The flow engine may manage execution of various sets of computer-readable instructions, which may correspond to sub-flows of the flow. During execution of the flow, an operation mode assigned to a set of computer-readable instructions (e.g., sub-flow) corresponding to one of the flow elements is determined (706). The operation mode may be determined by the flow engine by accessing configuration information associated with the sub-flow. The flow engine may then communicate an indication of the operation mode to the set of computer-readable instructions, either directly or via a flow handler associated the sub-flow. For example, the operation mode may be provided to the sub-flow via a parameter of the sub-flow. Alternatively, the operation mode may be determined by the set of computer-readable instructions (e.g., flow handler associated with the sub-flow) by accessing the configuration information. The operation mode indicates a level of permissions that is applicable to the set of computer-readable instructions. In some instances, the level of permissions indicates escalated permissions for the user in association with the set of computer-readable instructions.

The set of computer-readable instructions is executed according to the operation mode (708). Specifically, the operation mode is applied at run-time during the period that the set of computer-readable instructions is executed. During execution of the set of computer-readable instructions, an operation may be performed on a database record. For example, a database record may be created, updated, read, or deleted according to the operation mode assigned to the set of computer-readable instructions. During execution, an identity of the user is recorded in association with an operation on the database record according to escalated permissions.

It is important to note that permissions allocated in a user profile to the user may not provide the user permission to cause the operation on the database record. Where the operation mode is a system mode or other mode that provides escalated permissions, the permissions of the user may be ignored. Thus, escalated permissions of the operation mode may enable the database record operation to be performed by the system during execution of the flow even if the user permissions would not otherwise permit the database record operation to be completed. The escalated permissions would not be applicable outside the flow, either after execution of the flow has been completed for the user or via another mechanism.

In some implementations, permissions of the user may be ignored by a process flow executing in system mode or another mode that provides escalated permissions. The "overriding" of user permissions may be performed where the process flow is initiated by the user, for the user, or on behalf of the user. However, the process flow may comply with permissions of other users during execution of the process flow in "system mode with sharing." In other words, the process flow may not ignore or override the permissions of other users. While in "system mode without sharing," the process flow may override or ignore all user permissions during execution of the flow.

In some implementations, during execution of the set of computer-readable instructions, an indication of input to the set of computer-readable instructions is obtained. The input may include user input submitted via a GUI corresponding to a screen element of a flow. Alternatively, the input may include a value or variable provided via a parameter of the flow. The input may include or correspond to a record identifier that is used during a read or delete operation, text, or another value. For example, the record identifier may correspond to an Account, Contact, or Case. An operation on the database record may then be performed using the input. For example, a database record may be created, updated, or deleted using the input.

Since each flow may be configured with a corresponding operation mode, the main flow may be initiated according to a first level of permissions while a sub-flow may be executed according to a second level of permissions different from the first level of permissions. In some implementations, a flow that has not been configured with an operation mode may be executed according to a default mode of operation. For example, the default mode of operation may be a "Run as User" mode.

Inheritance may be applied to a flow. For example, a child flow may inherit the operation mode of a parent flow. In some implementations, inheritance may be applied where the child flow has not been configured with an operation mode. Alternatively, inheritance may be applied when specific condition(s) are met. For example, inheritance may be applied where a parent flow is configured with an operation mode such as "run as system mode with sharing" and a child flow is configured with another operation mode such as "run as system mode without sharing." In some implementations, inheritance may not be applied where the parent flow is configured with an operation mode such as "run as system mode without sharing."

Output indicating a result of executing the set of computer-readable instructions according to the operation mode may be provided for presentation via a GUI (710). This enables users to view data obtained from database records that the user would not otherwise be able to access. For example, an autofill or prepopulate function may prefill a field of a web page or form with the data. This may be useful, for example, in situations where the data includes the user's personal data, brands of smart phones or laptops available for assignment to the user, or user-selectable options that may be selected by the user during the onboarding process.

In the above-described example, during execution of a sub-flow, escalated permissions are enforced for the user in "Run as System" mode. Other examples of operation modes include "Run as User," "Run as System with Sharing," "Run as System without Sharing," and conditional operation modes. In addition, in some implementations, the level of permissions may enable a sub-flow to run with the permissions of another designated user.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, California salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
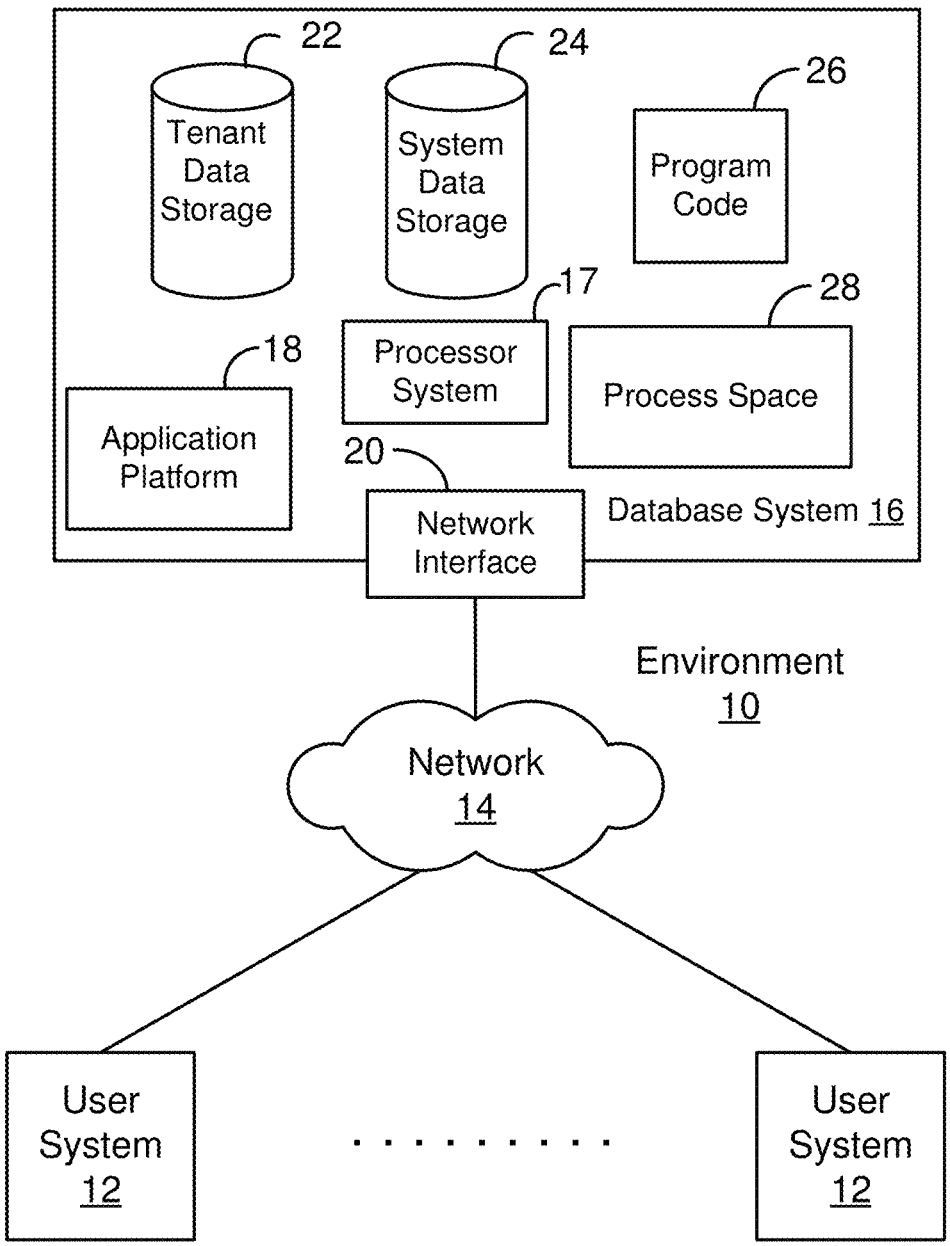
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
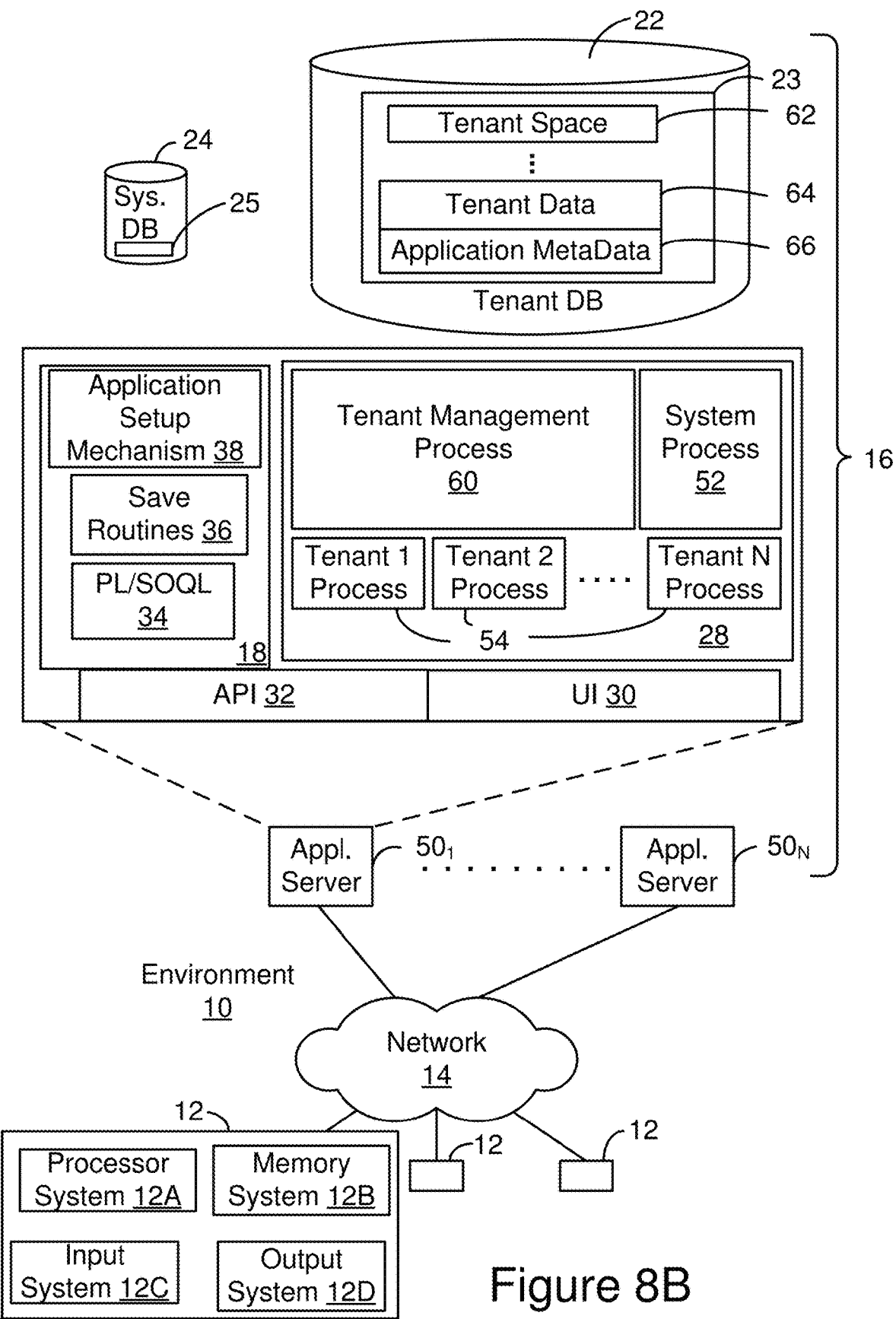
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
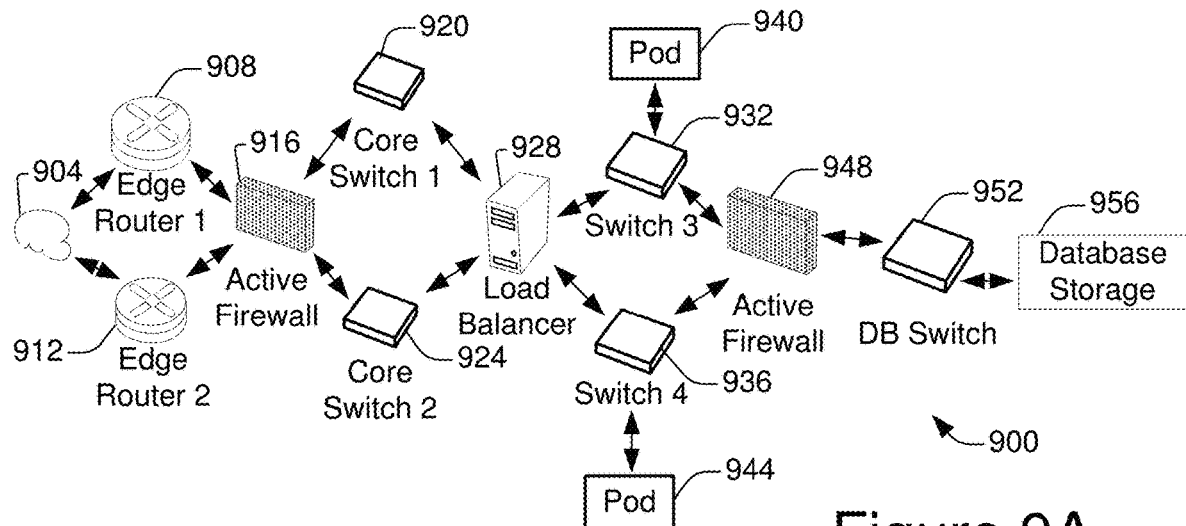
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
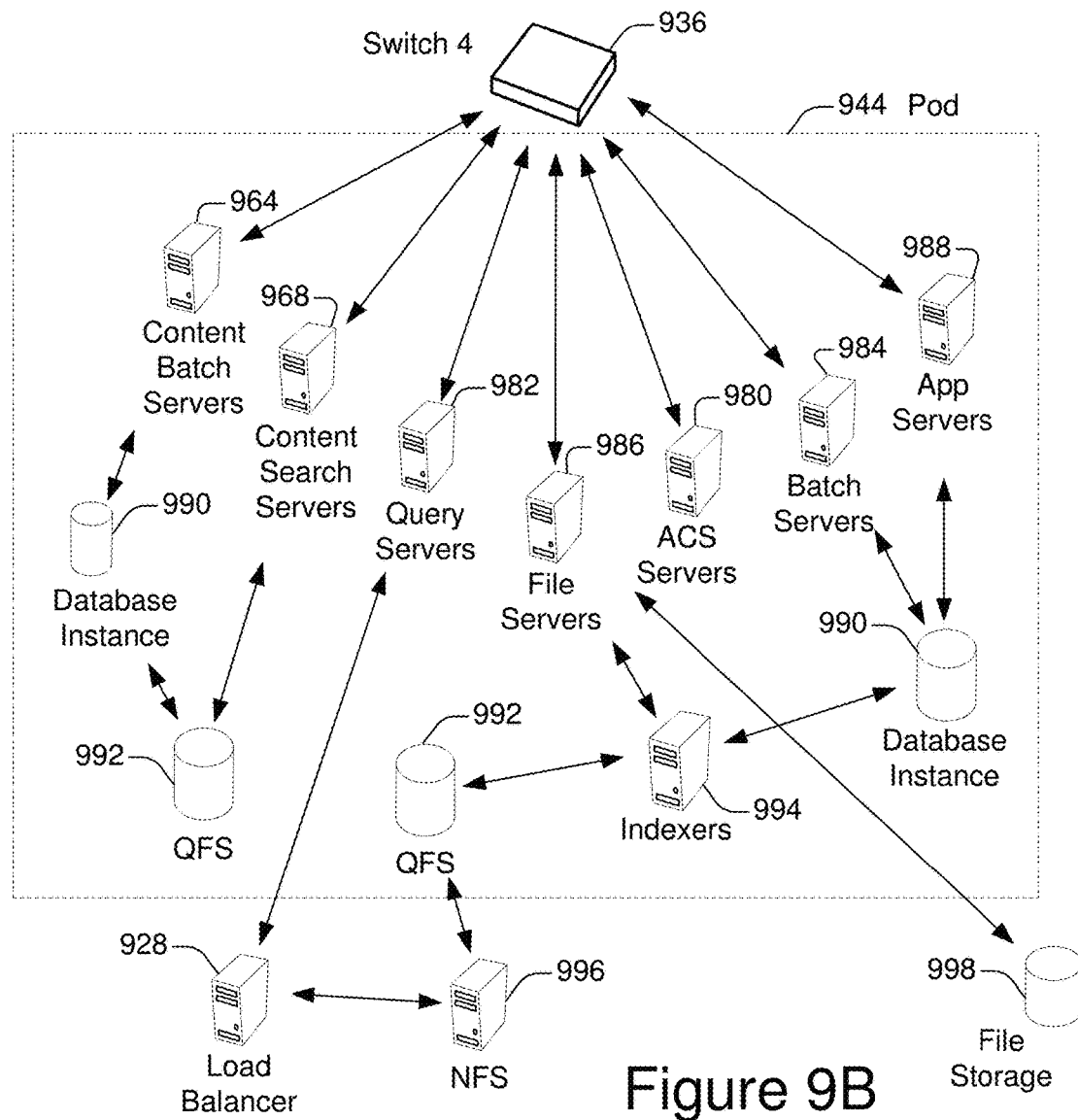
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
processing a request from a first user to initiate execution of a flow including a plurality of flow elements;
initiating execution of the flow;
identifying a user-selected operation mode from a set of configurable modes including a user mode, a system mode with sharing and a system mode without sharing, the selected operation mode being the system mode without sharing which does not comply with and overrides one or more permissions of the first user in favor of escalated permissions provided during system mode without sharing;
assigning the selected operation mode to a set of computer-readable instructions corresponding to one of the flow elements, the set of computer-readable instructions including a parent flow having a hierarchical relationship with a child flow configurable to: inherit an operation mode of the parent flow when the selected operation mode is the system mode with sharing, and not inherit the operation mode of the parent flow when the selected operation mode is the system mode without sharing;
determining a level of the escalated permissions that is:
  applicable to the set of computer-readable instructions, and
  in compliance with permissions of one or more other users while overriding the one or more permissions of the first user;
executing the set of computer-readable instructions according to the selected operation mode such that an identity of the first user is recorded in association with an operation on a database record, wherein the one or more permissions of the first user allocated in a user profile of the first user do not provide permission to cause the operation on the database record; and
providing, for presentation via a graphical user interface (GUI), output indicating a result of executing the set of computer-readable instructions according to the selected operation mode.

2. The system as recited in claim 1, wherein executing the set of computer-readable instructions comprises:
obtaining an indication of input to the set of computer-readable instructions; and
creating, updating, reading, or deleting the database record using the input according to the selected operation mode.

3. The system as recited in claim 1, wherein executing the set of computer-readable instructions comprises:
ignoring, according to the selected operation mode, the one or more permissions of the first user.

4. The system as recited in claim 1, the database system being further configurable to cause:
during execution of the flow, obtaining an indication of input to the set of computer-readable instructions, the one flow element being a user interface element, and the input being user input of the first user, the set of computer-readable instructions being executed using the input.

5. The system as recited in claim 1, the set of computer-readable instructions being a sub-flow, the database system further configurable to cause:
storing, in association with the sub-flow, metadata including an indication of the selected operation mode;
wherein identifying the selected operation mode assigned to the set of computer-readable instructions is performed using the metadata.

6. The system as recited in claim 1, the set of computer-readable instructions being a sub-flow, wherein initiating execution of the flow is performed according to a first level of permissions and the selected operation mode is associated with a second level of permissions different from the first level of permissions.

7. The system as recited in claim 1, the set of computer-readable instructions being a sub-flow.

8. A computer program product comprising computer-readable program code capable of being executed by one or more processors when retrieved from a non-transitory computer-readable medium, the program code comprising computer-readable instructions configurable to cause:
processing a request from a first user to initiate execution of a flow including a plurality of flow elements;
initiating execution of the flow;
identifying a user-selected operation mode from a set of configurable modes including a user mode, a system mode with sharing and a system mode without sharing, the selected operation mode being the system mode without sharing which does not comply with and overrides one or more permissions of the first user in favor of escalated permissions provided during system mode without sharing;
assigning the selected operation mode to a set of computer-readable instructions corresponding to one of the flow elements, the set of computer-readable instructions including a parent flow having a hierarchical relationship with a child flow configurable to: inherit an operation mode of the parent flow when the selected operation mode is the system mode with sharing, and not inherit the operation mode of the parent flow when the selected operation mode is the system mode without sharing;
determining a level of the escalated permissions that is:
  applicable to the set of computer-readable instructions, and
  in compliance with permissions of one or more other users while overriding the one or more permissions of the first user;
executing the set of computer-readable instructions according to the selected operation mode such that an identity of the first user is recorded in association with an operation on a database record, wherein the one or more permissions of the first user allocated in a user profile of the first user do not provide permission to cause the operation on the database record; and
providing, for presentation via a graphical user interface (GUI), output indicating a result of executing the set of computer-readable instructions according to the selected operation mode.

9. The computer program product as recited in claim 8, wherein executing the set of computer-readable instructions comprises:
obtaining an indication of input to the set of computer-readable instructions; and
creating, updating, reading, or deleting the database record using the input according to the selected operation mode.

10. The computer program product as recited in claim 8, wherein executing the set of computer-readable instructions comprises:
ignoring, according to the selected operation mode, the one or more permissions of the first user.

11. The computer program product as recited in claim 8, the computer-readable instructions further configurable to cause:
during execution of the flow, obtaining an indication of input to the set of computer-readable instructions, the one flow element being a user interface element, and the input being user input of the first user, the set of computer-readable instructions being executed using the input.

12. The computer program product as recited in claim 8, the set of computer-readable instructions being a sub-flow, the computer-readable instructions further configurable to cause:

storing, in association with the sub-flow, metadata including an indication of the selected operation mode;

wherein identifying the selected operation mode assigned to the set of computer-readable instructions is performed using the metadata.

13. The computer program product as recited in claim 8, the set of computer-readable instructions being a sub-flow, wherein initiating execution of the flow is performed according to a first level of permissions and the selected operation mode is associated with a second level of permissions different from the first level of permissions.

14. The computer program product as recited in claim 8, the set of computer-readable instructions being a sub-flow.

15. A method, comprising:

processing a request from a first user to initiate execution of a flow including a plurality of flow elements;

initiating execution of the flow;

identifying a user-selected operation mode from a set of configurable modes including a user mode, a system mode with sharing and a system mode without sharing, the selected operation mode being the system mode without sharing which does not comply with and overrides one or more permissions of the first user in favor of escalated permissions provided during system mode without sharing;

assigning the selected operation mode to a set of computer-readable instructions corresponding to one of the flow elements, the set of computer-readable instructions including a parent flow having a hierarchical relationship with a child flow configurable to: inherit an operation mode of the parent flow when the selected operation mode is the system mode with sharing, and not inherit the operation mode of the parent flow when the selected operation mode is the system mode without sharing;

determining a level of the escalated permissions that is:

applicable to the set of computer-readable instructions, and in compliance with permissions of one or more other users while overriding the one or more permissions of the first user;

executing the set of computer-readable instructions according to the selected operation mode such that an identity of the first user is recorded in association with an operation on a database record, wherein the one or more permissions of the first user allocated in a user profile of the first user do not provide permission to cause the operation on the database record; and providing, for presentation via a graphical user interface (GUI), output indicating a result of executing the set of computer-readable instructions according to the selected operation mode.

16. The method as recited in claim 15, wherein executing the set of computer-readable instructions comprises:

obtaining an indication of input to the set of computer-readable instructions; and creating, updating, reading, or deleting the database record using the input according to the selected operation mode.

17. The method as recited in claim 15, wherein executing the set of computer-readable instructions comprises:

ignoring, according to the selected operation mode, the one or more permissions of the first user.

18. The method as recited in claim 15, the method further comprising:

during execution of the flow, obtaining an indication of input to the set of computer-readable instructions, the one flow element being a user interface element, and the input being user input of the first user, the set of computer-readable instructions being executed using the input.

19. The method as recited in claim 15, the set of computer-readable instructions being a sub-flow, the method further comprising:

storing, in association with the sub-flow, metadata including an indication of the selected operation mode;

wherein identifying the selected operation mode assigned to the set of computer-readable instructions is performed using the metadata.

20. The method as recited in claim 15, the set of computer-readable instructions being a sub-flow, wherein initiating execution of the flow is performed according to a first level of permissions and the selected operation mode is associated with a second level of permissions different from the first level of permissions.

\* \* \* \* \*